United States Patent [19]
Fujita et al.

[11] Patent Number: 6,115,015
[45] Date of Patent: Sep. 5, 2000

[54] LIQUID CRYSTAL DISPLAY MODULE

[75] Inventors: Takashi Fujita, Yamato; Shuichi Odahara, Atsugi, both of Japan

[73] Assignee: International Business Machines Corporation, Armonk, N.Y.

[21] Appl. No.: 08/818,045

[22] Filed: Mar. 14, 1997

[30] Foreign Application Priority Data

Mar. 27, 1996 [JP] Japan ..................................... 8-071939

[51] Int. Cl.[7] ..................................................... G09G 3/36
[52] U.S. Cl. ............................. 345/88; 345/92; 349/108; 349/109
[58] Field of Search ................................ 345/87, 88, 92; 349/108, 109, 106, 104, 105

[56] References Cited

U.S. PATENT DOCUMENTS

| | | | |
|---|---|---|---|
| 4,470,667 | 9/1984 | Okubo et al. | 350/339 |
| 5,371,398 | 12/1994 | Nishihara | 357/30 R |
| 5,426,313 | 6/1995 | Sukegawa et al. | 257/59 |
| 5,541,748 | 7/1996 | Ono et al. | 359/58 |
| 5,573,959 | 11/1996 | Kodaira et al. | 437/21 |
| 5,668,649 | 9/1997 | Suzuki et al. | 349/42 |
| 5,772,299 | 6/1998 | Koo et al. | 353/20 |

FOREIGN PATENT DOCUMENTS

| | | | |
|---|---|---|---|
| 1-90029 | of 0000 | Japan | G02F 1/133 |
| 7013198 | 1/1995 | Japan | G02F 1/136 |
| 7287220 | 10/1995 | Japan | G02F 1/1335 |
| 9152587 | 6/1997 | Japan | G02F 1/1335 |
| 2228128 | 2/1989 | United Kingdom | G09F 9/35 |
| 2235326 | 2/1991 | United Kingdom | 9/35 |

*Primary Examiner*—Amare Mengistu
*Assistant Examiner*—Mansour M. Said
*Attorney, Agent, or Firm*—J. P. Sbrollini

[57] ABSTRACT

Blue bright spots occurring when using overhead projectors with liquid crystal modules (LCDs) are prevented by providing intercepting filter in the liquid crystal module for modifying light reaching the thin film transistors of the LCDs in the portion of the spectrum absorbed by and passing through the protection layer formed on the TFT. In the case where protection layer on the TFT is formed of an amorphous silicon layer, the intercepting filter has the characteristic of modifying the light having wavelengths of 380 nm to 500 nm. The intercepting filter being a color filter of other than blue is formed just above the TFT at least part of which is related to a cell of blue.

28 Claims, 5 Drawing Sheets

LIQUID CRYSTAL DISPLAY MODULE

FIELD OF THE INVENTION

The subject invention is related to preventing point defects which occur when a liquid crystal module having an optical transformation function is used with a very strong light source. Further, the subject invention is related to the configuration of color filters used in the liquid crystal module to prevent such point defects.

BACKGROUND ART

The decrease in size of electronic equipment has increased the use of liquid crystal displays (hereinafter referred to as LCDs) as a display means. The LCD is not only used as the screen of a computer, but also for other displays such as television screens, screens of projectors, etc. Displays utilizing liquid crystals have low power consumption, due to their use of low drive voltages, and relatively high response speed, and because of these advantages, it is expected that their use will expand to other applications in the future.

Most of the currently used LCDs are of the active matrix type. The active matrix type is one in which a drive circuit element is built in to each pixel to improve display characteristics. Active matrix LCDs, using thin-film Three-terminal transistors (TFTs) as switching elements are referred to as TFT type liquid crystal displays.

FIG. 1 shows a schematic diagram of a pixel portion of the array of TFT-type liquid crystal display. In one pixel opening 1, there are disposed a display electrode 2, a gate line 3, a gate electrode 3A, a data line 4, a drain electrode 4A, a source electrode 5, and a TFT active element 6. When the TFT is turned on by the signal on the gate line 3, the data line 4 is connected to the display electrode 2 via the source electrode 5 to make the potential of the data line 4 equal to the potential of the pixel electrode 2. As a result, the liquid crystal sealed above the pixel electrode 2 in the direction perpendicular to the drawing sheet is oriented to put that pixel in a display state.

In the sectional view shown in FIG. 2, the TFT active element portion in FIG. 1 is shown as a TFT 10 formed on a lower glass substrate 20. The TFT 10 is separated form an upper glass substrate 21 by a predetermined distance, and liquid crystal is sealed in a space 11 between the lower glass substrate 20 and the upper glass substrate 21. The liquid crystal (not shown) varies in its orientation according to the signal applied to the display electrode formed on the lower glass substrate 20. Because no pixel electrode exists in the area where the TFT 10 is formed, the orientation of the liquid crystal there cannot be controlled. In this uncontrolled area, a light intercepting layer 12 is provided to prevent the transmission of light. The light intercepting layer 12 is usually formed of an oxide of Cr. On the rear of the light intercepting layer 12 (on the lower glass substrate side), a light intercepting film 13 is formed. For the light intercepting film 13, Cr is usually used for compatibility with the light intercepting layer 12.

A sectional view of the TFT 10 is shown in FIG. 3. As shown in this sectional view, wiring material portions such as the gate electrode 71, which are formed on an undercoat portion 72 on the glass substrate 70, are isolated by a gate insulation film 73 from transparent electrode 74, an amorphous silicon layer 75, and source/drain electrodes 76 and 77. The gate insulation film 73 is composed of a silicon oxide or a silicon nitride, and laminated on the wiring material portion. The amorphous silicon layer 75 is interposed in the source and drain regions 76, 77, and operates as the channel region of the TFT 10.

Returning to FIG. 2, color filters 14 and 15 are formed on the lower surface of the upper glass substrate 21. The color filters 14 and 15 are usually films of an organic matter colored either red, green, or blue. The color filters 14 and 15 are arranged so that the adjacent ones are different in color. As shown in FIG. 4, the TFT 10 shown in FIG. 2 exists under the color filter of blue in the left side of FIG. 4, and the light intercepting layer 12 (shown by a rectangular frame) is positioned above it. Between the color filters 14 and 15, there is a black matrix 25 which does not transmit light. Returning to FIG. 2, light in path (a) is incident from below the lower glass substrate 20, and modulated by the orientation of the liquid sealed in the liquid crystal sealing portion 11, and colored when passing through the upper glass substrate 21 having the color filter 14 formed on the surface thereof.

One of the applications of the LCD, is using the liquid crystal as light modulation means (light valve) for projecting and magnifying in an overhead projector (OHP). A schematic diagram of this application is shown in FIG. 5. A LCD module 31 is placed on an OHP apparatus 30. The OHP apparatus 30 includes a light source 36, and the light emanating from the light source 36 responses to the signal for display supplied form a control unit 35 to the liquid crystal module 31, and modulated and colored in the liquid crystal module 31. Then, it is projected onto a screen 36 by an appropriate direction control and magnifying means 32. The principle of this is well known. The application of this kind is characterized in that the light source is very strong. That is, in the conventional LCD, the light source is included in the LCD and relatively weak, and the light emanating from the light source is modulated by an electric signal according to the supplied data to display a desired pattern. However, in this application, the light emanating from the light source included in the OHP apparatus 30, which is a light source outside the LCD, is modulated and colored by the liquid module. And, the light source 36 included in the OHP apparatus 30 generally has a light intensity greater than the light source included in the LCD, and usually cannot be optimized for use with the liquid module.

If the TFT-liquid module is used as a light valve while using such strong light source 36, many blue bright spots (point defects) are observed on the display screen and as a result, display characteristics are not realized. While the cause of the problem was not clear, it was well known that such point defects occur in applications in which a strong light source is used. The applications using a strong light source include a search light, the incidence of sunlight and the like in addition to the OHP.

As the conventional solution to this problem, a method of reducing the quantity of the light arriving at the TFT has been employed. One specific means for doing this, is to laminate color filters in layers for enhancing the optical density. However, the lamination process has process stability and residuum removal problems, and in addition, introduces problems such as inappropriate cell gaping that occurs because the increased thickness of the color filter.

BRIEF DESCRIPTION OF THE INVENTION

Therefore, it is an object of the subject invention to improve the display characteristics when the liquid crystal module is used as the light modulation means (light valve) for a strong light source by prevention of blue bright spots.

It is also an object of the subject invention to reduce the photo leakage current of TFTs caused by a very strong light.

In accordance with the present invention, light spots in displays produced using a liquid crystal module driven by TFTs are reduced by modifying spectrum of the light reaching the channel regions of the TFTs of the module. Means are provided to intercept light of the wavelength which is susceptible to absorption by the channel region of the TFTs, while otherwise leaving light passing through the LCD unaffected. In the case of blue light spots, light having a wavelength in the region of 380 nm to 500 nm is passed through a color filter other than blue formed just above the TFTs for the blue cells.

DETAILED DESCRIPTION OF THE INVENTION

The inventors have found that bright spots caused by the irradiation of an extremely strong light onto the TFT were due to a photo leakage phenomenon. With this phenomenon, two points were observed: (1) the bright spots were defects unique to where a strong light source is used; and (2) many bright spots (greater than 100/chip) were detected for blue, but less bright spots (less than 10/chip) for colors other than blue. From point (1), it was presumed that light has an effect on the TFT for some reason when the intensity of the light source is high. Further, from the point (2), that is, the dependency of the bright spot on color, it is presumed that the light having an effect on the TFT was light which had already passed through a color filter. Further, if a photo leakage phenomenon might be because of correlation between light and TFTs, it was presumed that point defects such as bright spots was due to a photo leakage phenomenon which occurs in the channel region of the TFT.

The photo leakage phenomenon is a phenomenon that free electrons in the channel region of the TFT are excited by light and have an energy higher than usual, resulting in an increase in the probability of their overcoming the band gap, which causes a leakage current to occur in the channel region formed between the drain and the source of the TFT. The current based on such phenomenon is hereinafter called a photo leakage current. If a photo leakage current occurs in the TFT, it is difficult to control the liquid cell. For instance if no potential is applied to the liquid cell, liquid crystal orientation cannot occur since no potential is provided to the display electrode related to that cell. However, if a photo leakage current occurs, a potential is produced in the display electrode even though no potential is intentionally applied to the liquid cell, and as a result, unwanted liquid crystal orientation occurs. This causes apparent degradation of the cutoff characteristics of the TFT (the characteristic of cutting off the potential when the TFT is turned of), and the control signal provided to the TFT and the liquid crystal orientation do not match, resulting in the development of point defects such as bright spots.

Figure 1:
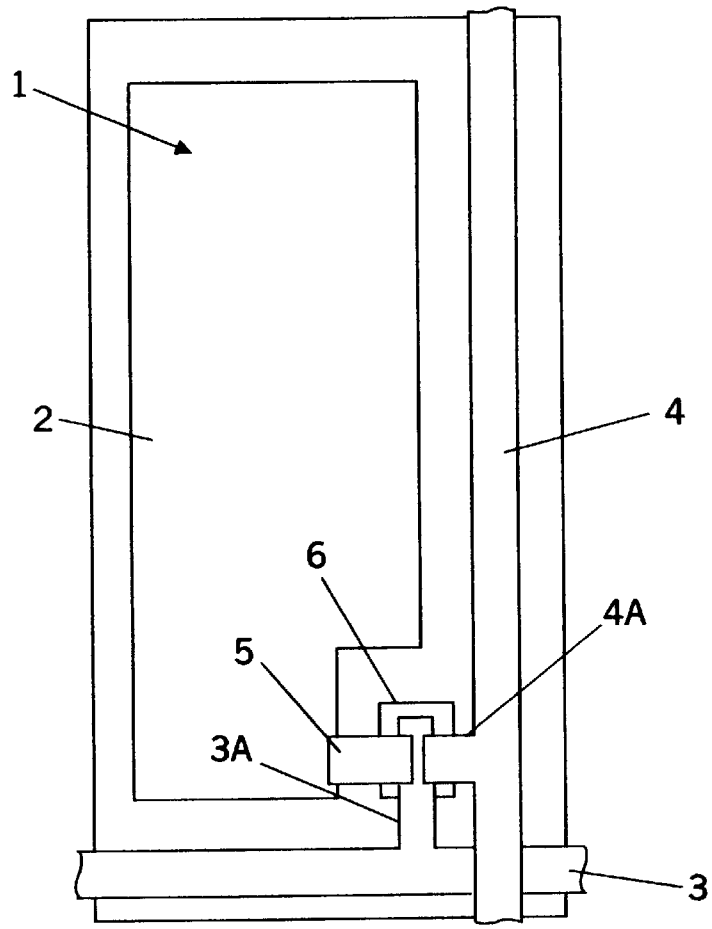
FIG. 1 is a schematic diagram of a TFT liquid crystal display cell.
Figure 2:
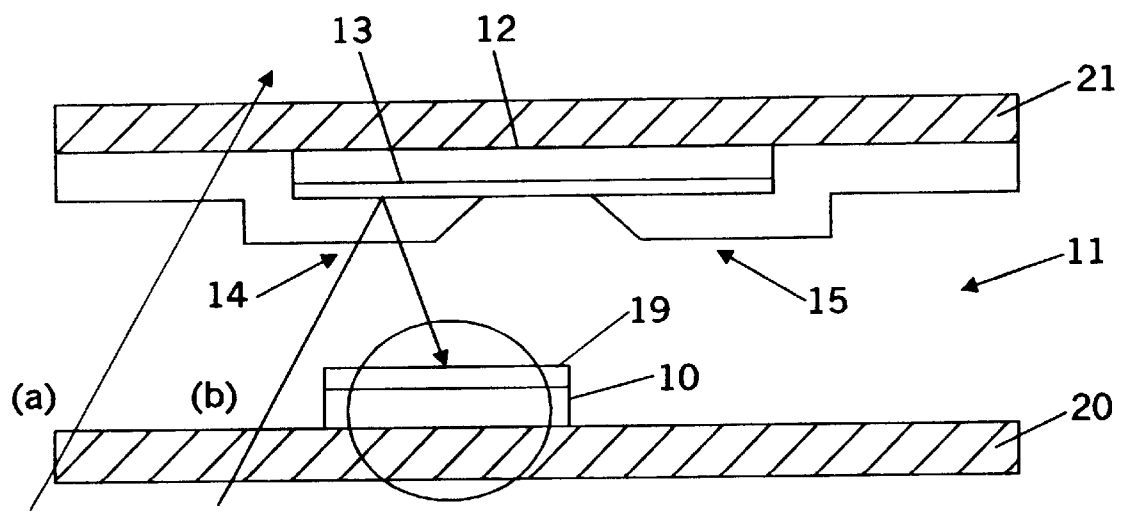
FIG. 2 is a sectional view of the TFT portion according to the background art.
Figure 3:
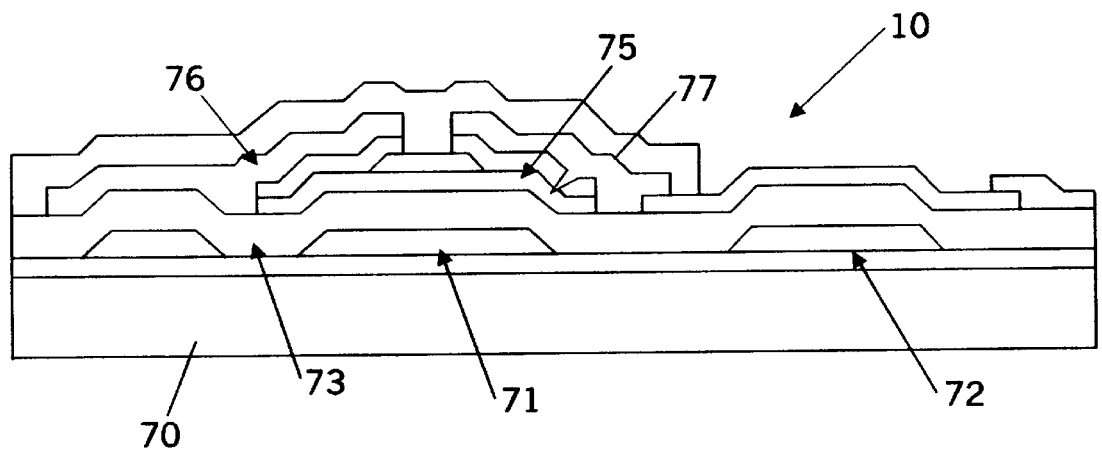
FIG. 3 is a detailed sectional view of the TFT portion according to the background art.

When light spots caused by photo leakage are color dependent, the above described condition (2), it can be presumed that it is a result of light in path (b) in FIG. 2 impinging on the TFT 10. That is, while normally light goes out the display surface via path (a), some light incident from below the lower glass substrate 20 is reflected by the light intercepting film 13 formed on the surface of the light intercepting layer 12 onto the surface of the TFT 10. Since light in path (b) also passes through the color filter 14, it is colored possibly explaining why the defect depends on color.

It is also important to know the magnitude of the photo leakage current when point defects such as bright spots are observed. This is because even if a hypothesis seems qualitatively correct, the hypotheses is incorrect if it is completely unrealistic in view of quantitative considerations. In a typical LCD cell, the capacitance of one pixel is in the order of $3 \times 10^{-13}$ F, and if the applied voltage is assumed to be 5 V, the quantity of accumulated charges is about $1.5 \times 10^{-13}$ C. If it is assumed that the refresh interval is 60 Hz, and that these charges are observed as bright spots if they completely leak in a time span of one frame, the current flowing at this point is in the order of $10^{-10}$ A. It is considered that bright spots occur when the photo leakage current flows to such extent, and this order of the photo leakage current is fully possible.

Figure 6:
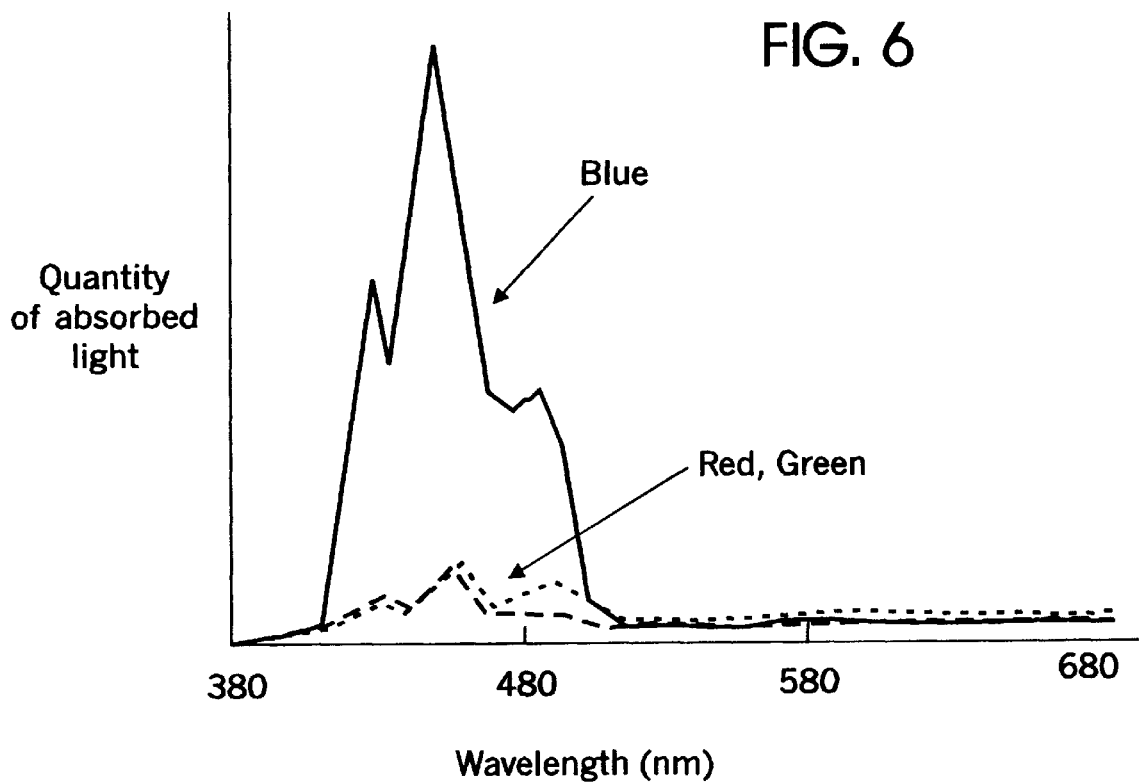
FIG. 6 is a graph showing the wavelength dependency of the quantity of the light absorbed by the amorphous silicon layer.

The inventors measured the light absorbed by the channel region of each of red (R), green (G), and blue (B) light. Since the channel region part of the TFT is formed of an amorphous silicon layer, the value of the photo leakage current is substantially proportional to the light absorption characteristics for the amorphous silicon layer. That is, the photo leakage current is the excitation of electrons by the energy of the light absorbed by the channel region. FIG. 6 shows the wavelength dependency of the quantity of the light absorbed by the amorphous silicon layer. In FIG. 6, the quantity of absorbed light is plotted on ordinate, and the wavelength is plotted on abscissa. The quantity of absorbed light is a composite of three spectrums: the wavelength spectrum of the light source of an OHP or the like, the wavelength dependency of the absorption coefficient of amorphous silicon: and the transmission spectrum of the color filter. By far, the largest amount of absorbed light is light having a wavelength not longer than 520 nm. In the LCD display module, light having this wavelength region passes through filters of blue (B), green (G) and red (R). The quantity of absorbed light is extremely high for light that passed through the filter of blue (B) as compared with light that passed through the filters of green (G) and red (R). Since the quantity of absorbed light is large for such specific wavelength, the photo leakage current becomes large for the light of this wavelength in the channel region of the amorphous silicon layer. The unique absorption characteristics of the amorphous silicon layer has a peak in the vicinity of 430 to 460 nm, and expands over the range of about 380 to 520 nm.

As a result of a more specific experiment, it was observed that, in a typical LCD cell, when a light of the blue (B)

wavelength and a light of the red (R) wavelength were incident under the same conditions, the former generated a photo leakage current four to five times greater than the latter. That is, to produce the same photo leakage current, light in the blue (B) wavelength only required a light intensity of about ⅙ of that used for the red (R) wavelength.

In connection with the cause of the magnitude of the photo leakage current resulting from light in the blue (B) wavelength, it is pointed out that blue (B) light has high energy because its wavelength is short as compared with those of other colors. Accordingly, the reasons for the high occurrence of a photo leakage current for blue (B) can be summarized by the following two points: (1) The absorption characteristics for the amorphous silicon layer forming the channel region is high for blue light, (2) light energy in the blue region is high.

Further, it can be concluded that the light causing the photo leakage current is the light which is incident from the lower glass substrate, reflected at the intercepting film, and absorbed by the amorphous silicon layer forming the channel region of the TFT. The reasons for this conclusion are that the channel region of the amorphous silicon layer is exposed to light only through this route, and that the color dependency of the occurrence of point defects such as bright spots can be explained because the light of this route is colored when it passes through a color filter.

In the application of the conventional liquid crystal module, the light source itself is contained in the LCD as a back-light and the output of the light source is relatively weak, and thus the point defects due to photo leakage current are insignificant. That is, even if a photo leakage current occurs, it did not reach a quantitatively significant level. The photo leakage problem seems to be unique to the use of the strong light source such as an OHP or the like where the output is 100 to 1,000 times that of the usual back-light. When such strong light source is used, the value of the photo leakage current reaches a quantitative value that develops bright spots.

Figure 7:
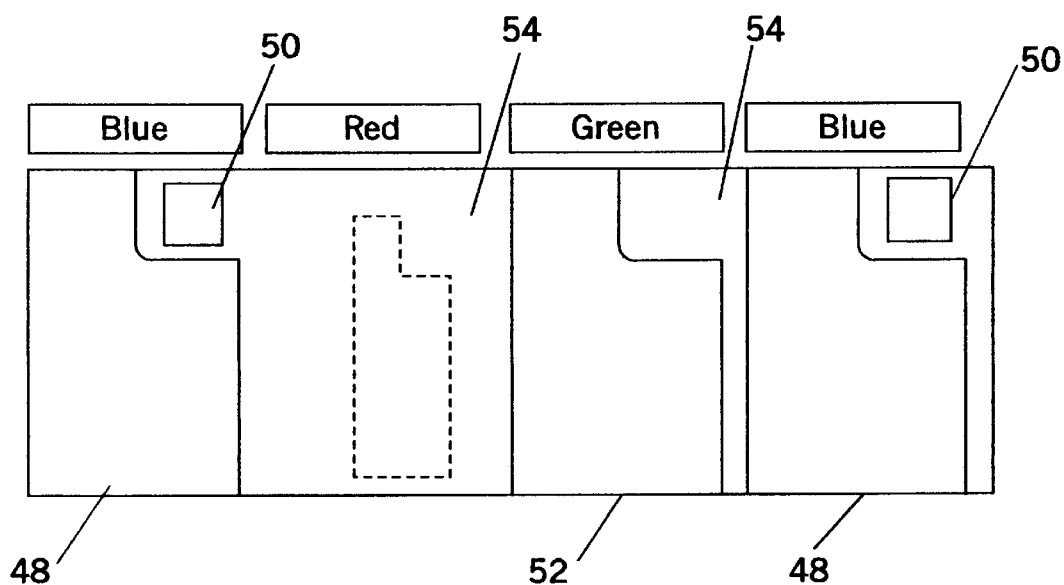
FIG. 7 is a figure showing the arrangement of color filters for the first embodiment related to the subject invention.

As shown in FIG. 7, to overcome point defects of blue bright spots a color filter 54 of red related to another cell adjacent to a cell 48 of blue is extended to above a TFT 50 for driving the cell 48 of blue. In FIG. 7, the color filter 54 of red is also formed above the TFT for a cell 52 of green in addition to the cell 48 of blue. Red has the lowest light energy because it has the longest wavelength, and photo leakage current can more effectively prevented by forming the color filter of red even above the TFT related to the cell of green. When the light source becomes very strong, the photo leakage current may be significant in the cell of green.

Figure 8:
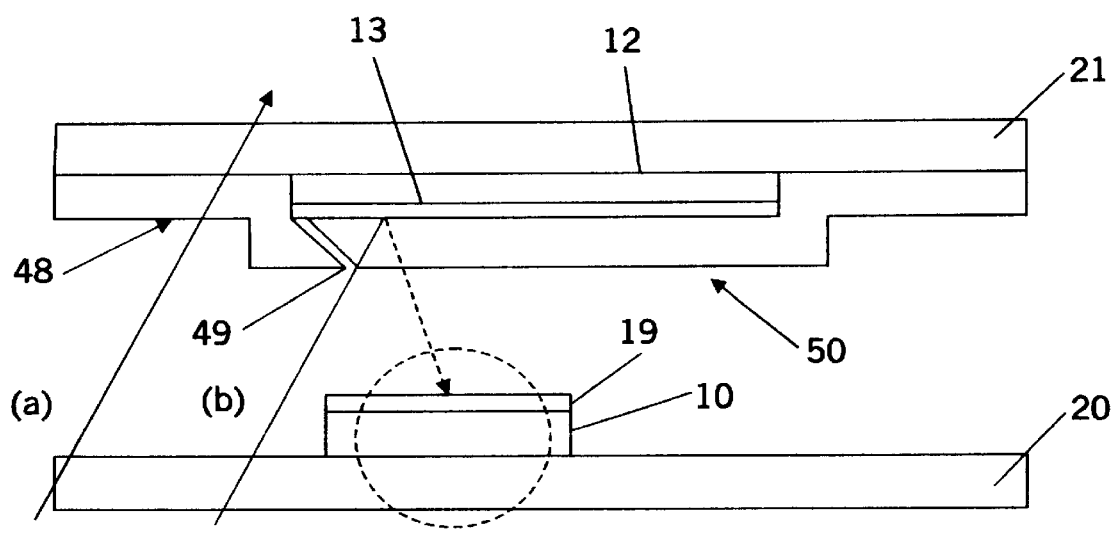
FIG. 8 is a sectional view of the TFT portion of the first embodiment related to the subject invention.
Figure 9:
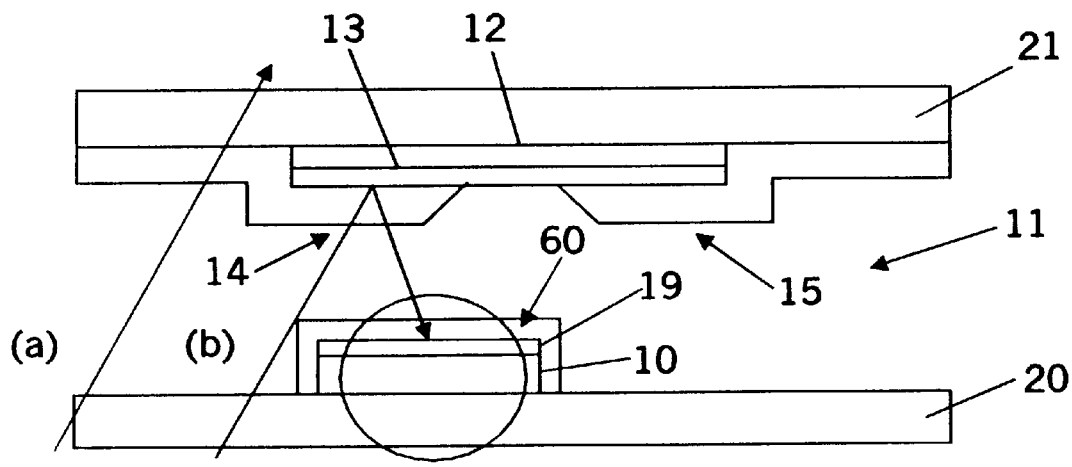
FIG. 9 is a sectional view of the TFT portion of the second embodiment related to the subject invention.

The cross section of the cell for the embodiment in FIG. 7 is shown in FIG. 8. FIG. 9 can be compared to FIG. 2 showing the background art. Elements common to both FIG. 2 and FIG. 8 are given the same number. The embodiment of FIG. 8 differs from that of FIG. 2 in the position of the boundary 49 between the color filter of blue (B) and the color filter of red (R). That is, in FIG. 8 the color filter 50 of red is formed above the TFT 10 related to blue (B) instead of the color filter 48 of blue. Like FIG. 2, light in FIG. 8 is reflected by the light intercepting film 13 formed on the light intercepting layer 12 and arrives at the amorphous silicon layer 19, but this light is not absorbed as readily by the amorphous silicon layer 19 because it is colored red instead of blue. Accordingly, light absorption into the channel region, the cause of a photo leakage current, is prevented. The filter used in this embodiment need not always be a red filter. It is enough that the cut-off characteristics of the filter be effective to employ those in the wavelength range of 380 nm to 520 nm. In addition, the interception in that wavelength range need not be complete. It is enough if the transmission rate is 30% or less of the embodiment of FIGS. 7 and 8. The transmission rate is considered to be a design value which depends on the correlation between the light source intensity, the absorption characteristics of the channel region in the wavelength region cut off by the filter, and the acceptable value of the photo leakage current which causes point defects.

Background art for solving bright spot problems involves a symptomatic treatment. Recognizing that bright spots occur if a strong light source is used, the intensity of the light supplied by the light source is reduced by a color filter or the like. In contrast to this, the means of solving in the subject invention is more fundamental; focussing on the cause of photo leakage current. That is, having found out that the cause of the occurrence of point defects such as bright spots is the photo leakage current due to the strong light applied onto the TFT, and that the color dependency of point defects on color is caused by the light wavelength dependency of the absorption characteristics of the amorphous silicon formed as the channel region of the TFT. And, recognizing the problem of reducing the light absorbed by the amorphous silicon layer by changing the color (or quality) of the light arriving at the amorphous silicon layer, rather than reducing the quantity of the light arriving at the amorphous silicon layer. That is, it is essentially different from the background art in that the quality of the light rather than the quantity of the light is changed as the solution.

Figure 4:
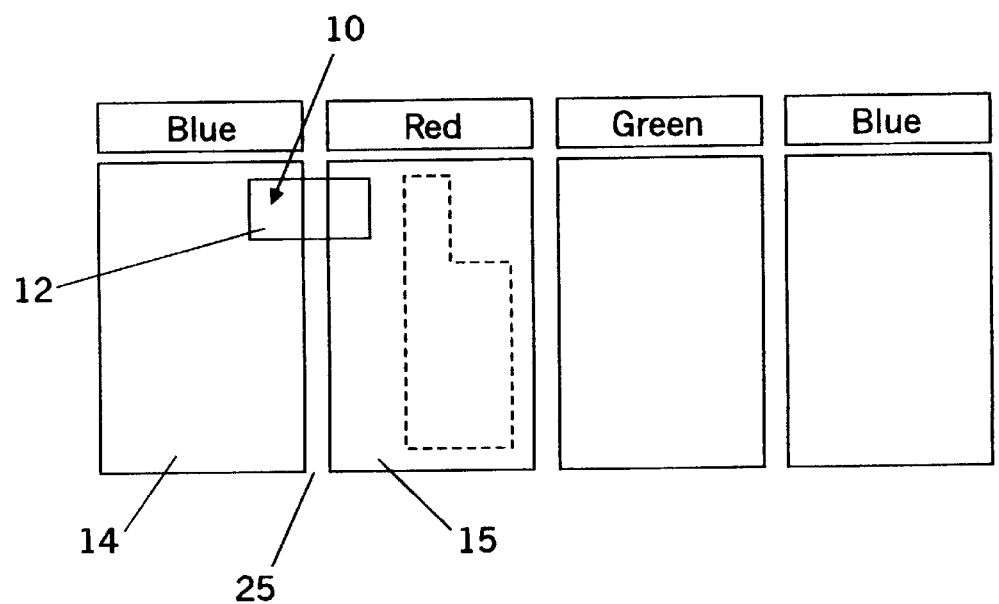
FIG. 4 is a figure showing the arrangement of color filters.
Figure 5:
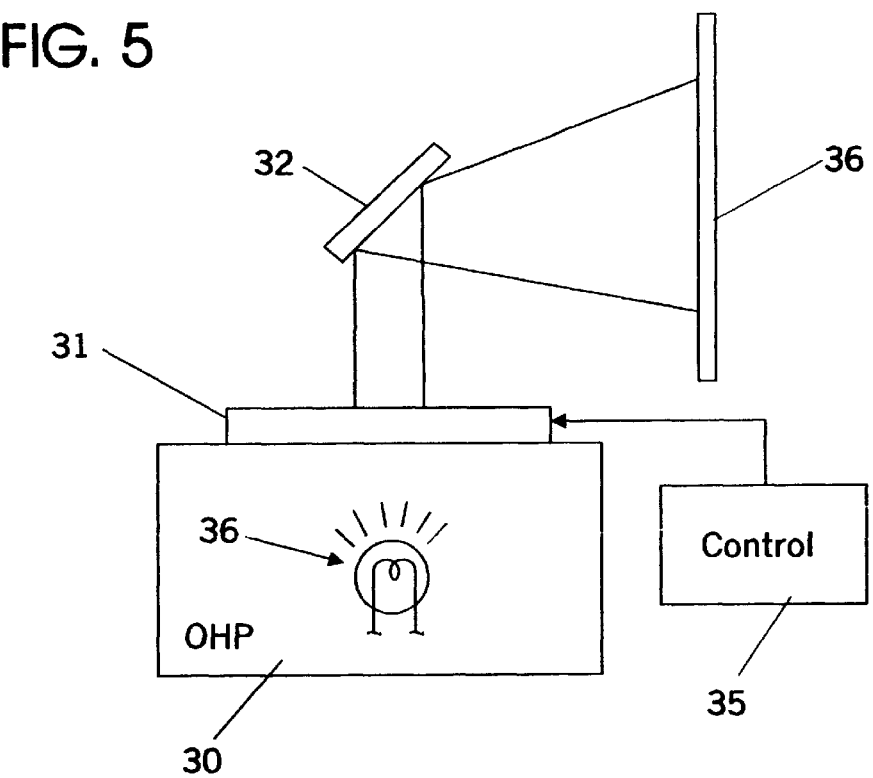
FIG. 5 is a schematic diagram of the application of the liquid crystal module to the OHP.

Changing the color of the light arriving on the amorphous silicon in the channel region of the TFT in accordance with the invention, is not necessarily limited to the optimization of the placement pattern of color filters. For instance, a separate color filter performing a color conversion function can be provided on the amorphous silicon without changing the traditional color filter placement pattern shown in FIG. 4. This is shown in FIG. 9. The structure shown in FIG. 9 differs from that of the background art shown in FIG. 2 in that, a film 60 is formed over the amorphous layer having a function of converting the light arriving on the amorphous silicon layer to a color other than blue.

Figure 10:
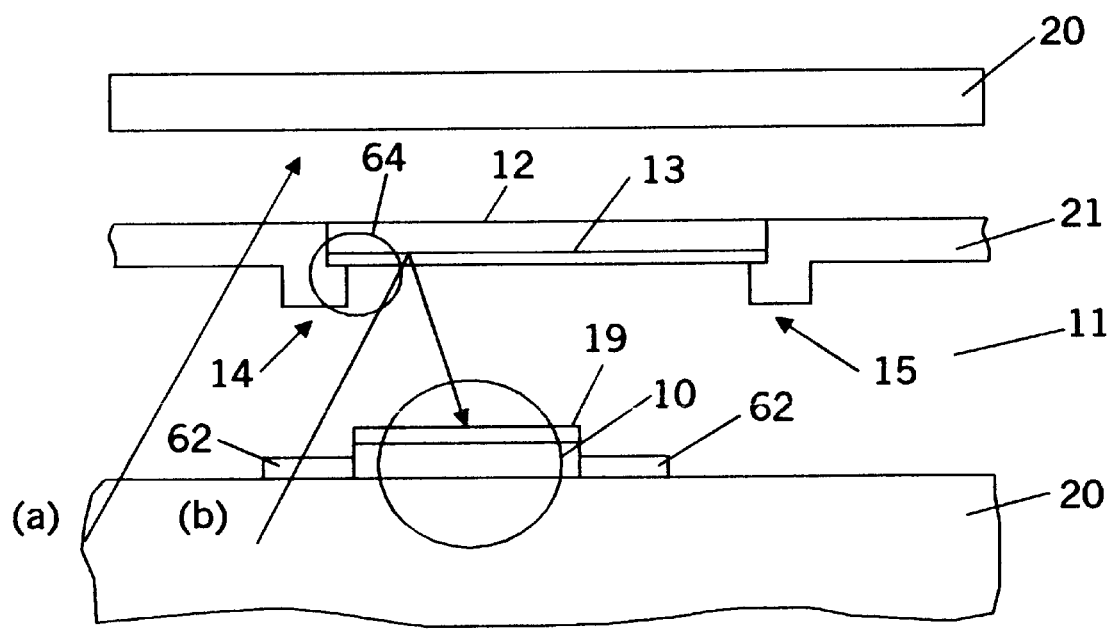
FIG. 10 is a sectional view of the TFT portion of the third embodiment related to the subject invention.

Further, if colors other than blue are allowed to impinge on the amorphous silicon layer, a third embodiment shown in FIG. 10 is possible. In this embodiment, a film 62 having a function of the conversion to a color other than blue is formed around the TFT 10 in a position to intercept light in path (b) before it is reflected into the amorphous layer 19. As a result, the light reflected by the light intercepting layer 12 or the light intercepting film 13 onto the amorphous silicon layer 19 is light of a color other than blue. With this embodiment, the size color filters compared with those in FIG. 2 are also reduced in the area surrounded by the circle 64. These second and third embodiments can be manufactured by well-known manufacturing methods.

As seen from the above embodiments, when the subject invention resides in a TFT-type liquid crystal module, the module is configured to prevent blue light from arriving at the amorphous silicon layer. In other words, in a TFT-type liquid crystal module, the path of a light arriving at the amorphous silicon layers formed as the channel regions of the TFTs, includes means for cutting off light in the wavelength region of 380 nm to 500 nm to prevent the light of this wavelength from arriving at those amorphous silicon layer.

The most preferred embodiment from the manufacturing standpoint is that shown in FIG. 7. This is because, in the embodiment of FIG. 7, only the color filter pattern is changed. This only requires changing the mask pattern when forming the color filters without requiring any additional process steps.

Although the embodiments in the specification of this application are discussed in connection with their use in an OHP, the invention is not limited to that application. It can be used where a strong light such as the sunlight is incident on the upper glass substrate. That is, the subject invention can be applied to all the cases in which a light strong enough to allow the flowing of a photo leakage current which is enough to develop point defects such as bright spots arrives at the channel region of the TFT.

Thus in accordance with the present invention, point defects such as bright spots due to the photo leakage current of a TFT in the use of a strong light source can be prevented. Further, the increase of the reliability of the TFT can also be achieved. In accordance with the means shown in the first embodiment as the solving means, modification of the mask pattern for the color filter formation is enough to achieve this advantage, and no new process is required.

If material other than amorphous silicon is used as the channel region of TFTs of LCD modules, the present invention may be practiced by providing means in the path of the light arriving at the channel region for converting that light to a color not easily absorbed by that material. As long as point defects such as bright spots are produced by photo leakage current, other modifications of the embodiments disclosed in the present application will be apparent to those skilled in the art.

Therefore, while the invention has been particularly shown and described in reference to three embodiments thereof, it should be understood by those skilled in the art that various changes may be made in those embodiments without departing from the spirit and scope of the invention.

What is claimed:

1. A projecting apparatus for modulation of light to provide multicolor images, said projecting apparatus comprising:
   a) a light source,
   b) a projector for projecting the light from the light source; and
   c) a light modulation device for modulating the light from said light source, wherein said light modulation device is the liquid crystal module having;
      i) a first transparent plate;
      ii) a second transparent plate opposed to said first transparent plate;
      iii) a liquid crystal interposed between said first transparent plate and said second transparent plate;
      iv) a patterned arrangement of light filters of different colors for projecting multicolor images covering pixel areas defined by an opaque mask formed on said first transparent plate;
      v) a separate thin-film transistor element portion formed on said second transparent plate to modulate the light passing through each of the light filters; and
      vi) an interception light filter portion of one of the different colors in the path of light reflected from a reflecting surface on the opaque mask and arriving at a channel region of said thin-film transistor element portion for another of the different colors, which intercepting light filter is provided for eliminating light spots by modification of a spectrum of the light containing a color band susceptible to absorption by said channel region, while not effecting the spectrum where it passes through other portions of the liquid crystal module.

2. The projecting apparatus of claim 1 wherein the filter of the one of the different colors has a main rectangular body with a tab extending from one side thereof overlying the thin film transistor for the another of the different colors.

3. The projecting apparatus of claim 2 wherein said color filter of the another of the different colors has a rectangular body with a cutout portion to accommodate placing the tab of the filter of one color within the cutout portion.

4. The projecting apparatus of claim 1 wherein the filter of another of the different colors is blue and the filter of one color is red.

5. In a liquid crystal display module using thin film transistors to control the response of liquid crystal in pixel areas to light to provide multicolor images using color filters, the method comprising:
   modifying a spectrum of light reflected internally in the module off reflecting surfaces on a mask defining the pixel areas and reaching the channel regions of the thin film transistors controlling the transmission through filters of one color controlling a particular color band of the spectrum of the light, which color band is susceptible to absorption by said channel regions to cause light spots;
   performing the modification by using a color filter of another color to filter the particular color band out of the spectrum of light reaching said channel regions to thereby prevent generation of light spots of the one color.

6. The method of claim 5 including the steps of:
   configuring the shapes of the color filters used to provide the multicolored images so that the color filter of another color is larger than the color filter of the one color and is interposed between the reflecting surfaces and the channel region so that light reflected back off the reflecting surfaces onto the thin film transistors controlling the transmission through the filters of the one color passes through the color filters of another color instead of the color filters of the one color.

7. The method of claim 5:
   including the step of:
   covering the thin film transistors controlling the transmission through the filters of one color with an added color filter of another color so that light reaching the channel regions of the thin film transistors controlling the transmission through the filters of the one color must pass through the added color filter.

8. The method of claim 5 including the step of:
   surrounding the thin film transistors controlling transmission through the filter of one color with an additional filter of the another color and restricting the size of the filter of the one color so that light impinging on the thin film transistor controlling transmission through the filter of one color passes through the additional filter and not through the filter of the one color.

9. The method of claim 5 including the step of:
   using a red filter as the filter of the another color when the the filter of one color is a blue filter.

10. A module for use with a high intensity light source performing the modulation of light to project multicolor images said module comprising:
   a) a first transparent plate with an opaque mask defining light transmitting apertures;
   b) a second transparent plate opposed to said first transparent plate with thin film transistor elements mounted thereon each associated with a different one of the apertures for the modulation of light passing through that aperture;

c) a liquid crystal interposed between said first transparent plate and said second transparent plate responsive to the thin film transistor elements to modulate the light emitted from the apertures;

d) color filters positioned over the apertures for providing multicolor images, said color filters being mounted on said first transparent plate between the mask and the liquid crystal for interception of light reflected internally in the module off a light reflecting film on the mask towards the thin film transistor elements, the shape of each of the filters varying depending on its color with the color filter of one color shaped to be positioned in the path of a light arriving at the channel region of a thin film transistor element for modulating the light of another color which another color is susceptible to absorption in said channel region to cause light spots of that another color.

11. A module of claim 10 wherein said light filter of one color intercepts the light having a wavelength of 380 nm to 520 nm.

12. A module of claim 11 wherein said light filter of one color is a color filter of other than blue.

13. The module of claim 10 wherein the filter of one color has a main rectangular portion with a tab extending from one side thereof overlying the transistor controlling the light of said another color.

14. The module of claim 13 wherein the filter of another color is blue and the filter of one color is red.

15. The module of claim 14 including a filter of a third color, green.

16. The module of claim 15 including a second filter of red overlying the thin film transistor controlling the light passing through the green filter.

17. The module of claim 15 including a filter of the color red overlying a thin film transistor controlling the light passing through the green filter.

18. The module of claim 10 wherein the filter of one color is red the filter of the another color is blue.

19. The module of claim 10 wherein the filter of one color has a main rectangular body with a tab extending from one side thereof overlying the thin film transistor controlling the light of said another color.

20. The module of claim 19 wherein said color filter of another color has a rectangular body with a cutout portion to accommodate the positioning of the tab of the filter of one color within the cutout portion.

21. The module of claim 20 including a filter of a third color, green.

22. A module for use with a high intensity light source performing the modulation of light to provide multicolor images, said module comprising:

a) a first transparent plate with an opaque mask defining apertures light transmitting cells;

b) a second transparent plate opposed to said first transparent plate with thin film transistor elements mounted thereon each associated with a different one of the cells for modulation of light passing through that cell;

c) a liquid crystal interposed between said first transparent plate and said second transparent plate responsive to the thin film transistor elements to modulate the light emitted from the cells;

d) color filters of different colors on the first plate positioned over the apertures for providing multicolor images, the shape of a filter varying depending on its color with a color filter of one color configured to be positioned in the path of a light arriving at the channel region of a thin film transistor element for modulating the light passing through a color filter of another colon which another color is susceptible to absorption in said channel region to cause light spots of that another color.

23. The module of claim 22 wherein one color filter of one color is mounted on the first transparent plate between the mask and the liquid crystal to intercept light reflected back off a reflecting surface on the mask towards said channel region.

24. The module of claim 23 wherein the filter of another color is blue and the filter of one color is red.

25. A projecting apparatus for modulation of light to provide multicolor images, said projecting apparatus comprising:

a) a light source, b) a projector for projecting the light from the light source; and c) a light modulation device for modulating the light from said light source, wherein said light modulation device is the liquid crystal module having;

i) a first transparent plate;

ii) a second transparent plate opposed to said first transparent plate;

iii) a liquid crystal interposed between said first transparent plate and said second transparent plate;

iv) a patterned arrangement of light filters of different colors and shapes for projecting multicolor images covering pixel areas defined by an opaque mask formed on said first transparent plate;

v) a separate thin-film transistor element portion formed on said second transparent plate to modulate the light passing through each of the light filters; and vi) an interception light filter portion of one of the different colors in the path of light arriving at a channel region of said thin-film transistor element portion for another of the different colors, which intercepting light filter is provided for eliminating light spots by modification of a spectrum of the light containing a color band susceptible to absorption by said channel region, while not effecting the spectrum where it passes through other portions of the liquid crystal module.

26. The projecting apparatus of claim 25 wherein the filter of the one of the different colors has a main rectangular body with a tab extending from one side thereof overlying the thin film transistor for the another of the different colors.

27. The projecting apparatus of claim 26 wherein said color filter of the another of the different colors has a rectangular body with a cutout portion to accommodate the placing of the tab of the filter of one color within the cutout portion.

28. The projecting apparatus of claim 25 wherein the filter of another color is blue and the filter of one color is red.

* * * * *